United States Patent
George et al.

(10) Patent No.: US 8,599,856 B2
(45) Date of Patent: Dec. 3, 2013

(54) METHOD AND APPARATUS FOR PEER-TO-PEER CONNECTION ASSISTANCE

(75) Inventors: David A. George, Somers, NY (US); Raymond B. Jennings, III, Ossining, NY (US); Jason D. LaVoie, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 12/163,415

(22) Filed: Jun. 27, 2008

(65) Prior Publication Data

US 2008/0259940 A1    Oct. 23, 2008

Related U.S. Application Data

(63) Continuation of application No. 11/330,826, filed on Jan. 12, 2006, now abandoned.

(51) Int. Cl.
*H04L 12/28* (2006.01)
*H04L 12/56* (2011.01)
*G06F 15/173* (2006.01)
*G06F 15/16* (2006.01)

(52) U.S. Cl.
USPC ......... 370/395.2; 370/400; 709/225; 709/227

(58) Field of Classification Search
None
See application file for complete search history.

(56) References Cited

U.S. PATENT DOCUMENTS

| | | | | |
|---|---|---|---|---|
| 6,069,896 A | * | 5/2000 | Borgstahl et al. | 370/401 |
| 6,115,753 A | * | 9/2000 | Joens | 709/242 |
| 6,629,100 B2 | * | 9/2003 | Morris et al. | 707/10 |
| 6,826,694 B1 | | 11/2004 | Dutta et al. | |
| 6,950,821 B2 | * | 9/2005 | Faybishenko et al. | 707/688 |
| 7,065,579 B2 | * | 6/2006 | Traversat et al. | 709/230 |
| 7,120,687 B1 | | 10/2006 | Tessman et al. | |
| 7,788,378 B2 | * | 8/2010 | Rao et al. | 709/226 |
| 2002/0141544 A1 | * | 10/2002 | Brown et al. | 379/29.01 |
| 2003/0163731 A1 | | 8/2003 | Wigley et al. | |
| 2004/0054723 A1 | | 3/2004 | Dayal et al. | |
| 2004/0125776 A1 | * | 7/2004 | Haugli et al. | 370/338 |
| 2004/0181575 A1 | * | 9/2004 | Mallberg et al. | 709/203 |
| 2004/0233918 A1 | * | 11/2004 | Larsson et al. | 370/400 |
| 2005/0030930 A1 | * | 2/2005 | Cho et al. | 370/338 |
| 2006/0010225 A1 | * | 1/2006 | Issa | 709/217 |
| 2006/0272014 A1 | * | 11/2006 | McRae et al. | 726/12 |

* cited by examiner

*Primary Examiner* — Faruk Hamza
*Assistant Examiner* — Cassandra Decker
(74) *Attorney, Agent, or Firm* — Louis Percello

(57) ABSTRACT

One embodiment of the present method and apparatus for assisting a peer-to-peer connection between a first node and a second node includes receiving, at a third node, a request for connection assistance from one of the first and second nodes. The third node then connects to both the first node and the second node, receives the data from the first node and delivers the data to the second node. In this manner, data may be transferred between the first and second nodes even if the first and second nodes are unable to directly connect to each other (e.g., due to permanent or temporary limitations).

16 Claims, 5 Drawing Sheets

METHOD AND APPARATUS FOR PEER-TO-PEER CONNECTION ASSISTANCE

CROSS REFERENCE TO RELATED APPLICATIONS

This application is a continuation of U.S. patent application Ser. No. 11/330,826, filed Jan. 12, 2006, now abandoned entitled "METHOD AND APPARATUS FOR PEER-TO-PEER CONNECTION ASSISTANCE", which is herein incorporated by reference in its entirety.

FIELD OF THE INVENTION

The present invention relates generally to computing networks and relates more particularly to facilitating data transfers between computing devices.

BACKGROUND

FIG. 1 is a schematic diagram of a network 100 of nodes (e.g., computing devices) interacting in a peer-to-peer (P2P) manner. Generally, a requesting node 101 sends a search message 105 (e.g., containing keywords relating to data that the requesting node 101 wishes to locate) to one or more intermediate network nodes 111 connected to the requesting node 101. Each intermediate node 111 receives the search message 105 and then forwards the search message 105 to one or more additional nodes 111. Eventually, the search message 105 reaches one or more responding nodes 103 having the requested data. One or more responding nodes 103 then send a response message 107 back to the requesting node 101, e.g., via the intermediate nodes 111. The requesting node 101 then requests the relevant data from a responding node 103 by connecting directly to the responding node 103, e.g., via direct connection 109.

In some cases, the requesting node 101 and the responding node 103 may not be able to connect to or communicate with each other. This condition may be permanent (e.g., the requesting node 101 and the responding node 103 are each behind different firewalls), or it may only be temporary (e.g., a network outage occurring on a path between the requesting node 101 and the responding node 103). In either case, the requesting node 101 and the responding node 103 will be unable, at least immediately, to complete the desired data transfer. Although the requesting node 101 and the responding node 103 might be able to communicate via a series of other nodes 111, the necessary traversal of multiple network links makes this solution not optimal (e.g., due to multiple potential points of failure, response time, etc.).

Thus, there is a need in the art for a method and apparatus for peer-to-peer connection assistance.

SUMMARY OF THE INVENTION

One embodiment of the present method and apparatus for assisting a peer-to-peer connection between a first node and a second node includes receiving, at a third node, a request for connection assistance from one of the first and second nodes. The third node then connects to both the first node and the second node, receives the data from the first node and delivers the data to the second node. In this manner, data may be transferred between the first and second nodes even if the first and second nodes are unable to directly connect to each other (e.g., due to permanent or temporary limitations).

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for peer-to-peer connection assistance. Embodiments of the present invention enable data to be transferred between two nodes that are unable to connect directly (but are known to each other) by enabling the two nodes to use a partner node as an intermediary. The desired data is transferred to the partner node, which in turn delivers the data to the requesting node. In this manner, the desired data transfer can take place despite the inability of the transferring parties to connect directly.

Figure 1:
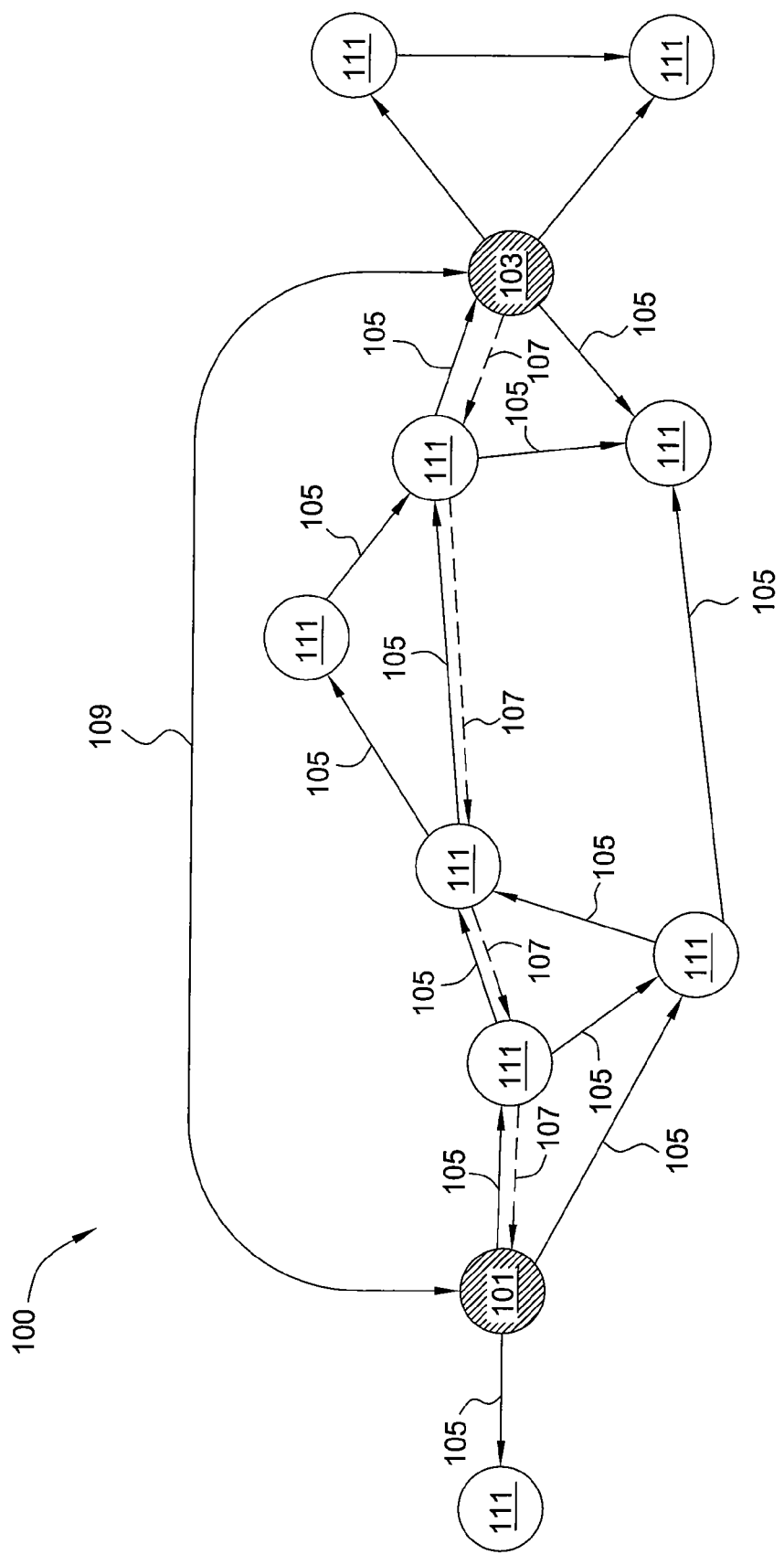
FIG. 1 is a schematic diagram of a network of nodes interacting in a peer-to-peer manner.
Figure 2:
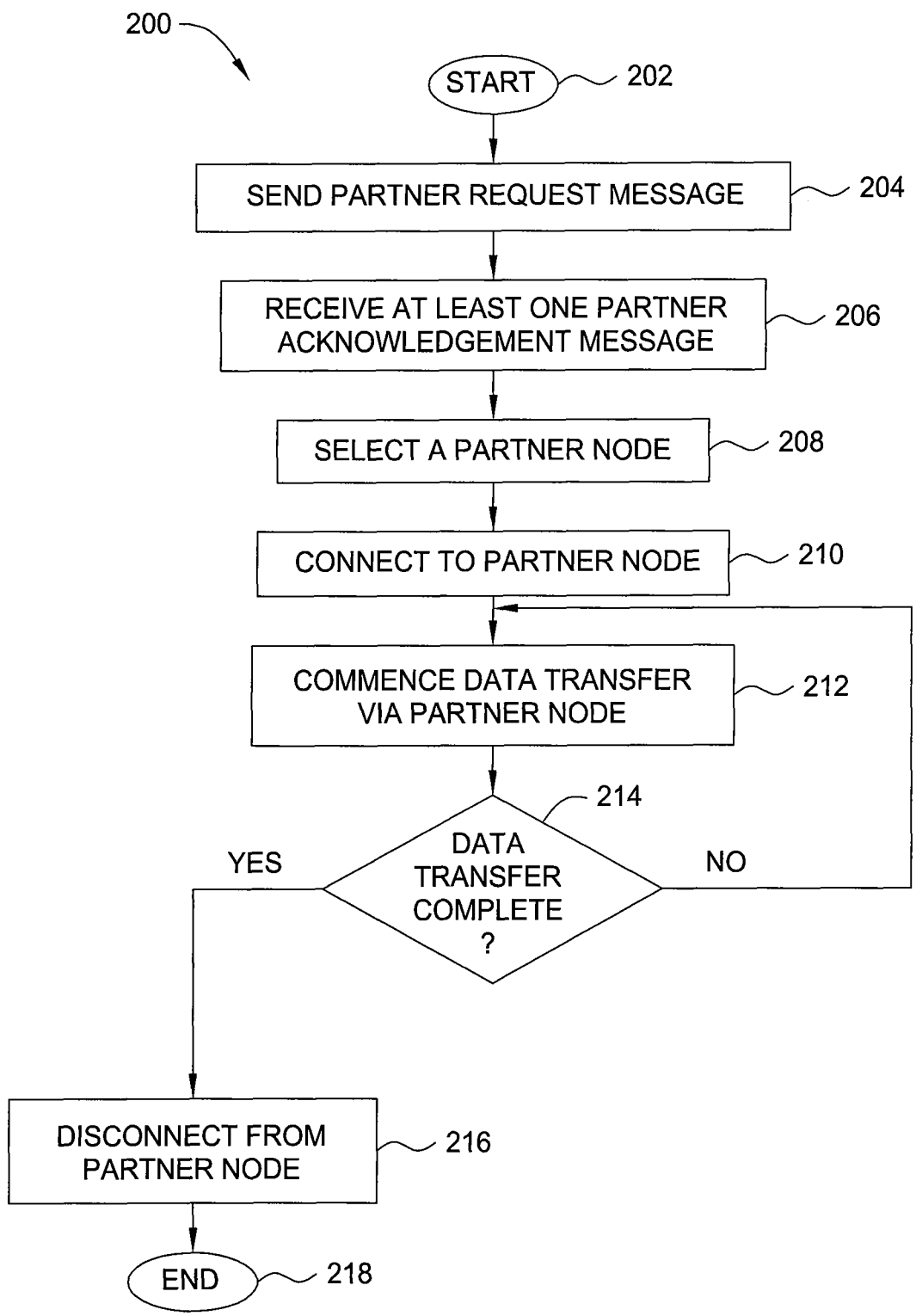
FIG. 2 is a flow diagram illustrating one embodiment of a method for facilitating a data transfer between two nodes that are unable to connect directly to each other.

FIG. 2 is a flow diagram illustrating one embodiment of a method 200 for facilitating a data transfer between two nodes that are unable to connect directly to each other (e.g., due to both nodes being behind different firewalls, a severed network link or high bandwidth usage). The method 200 may be implemented at, for example, the requesting node 101 or the responding node 103 of FIG. 1.

The method 200 is initialized at step 202 and proceeds to step 204, where the method 200 sends a partner request message. That is, the method 200 solicits responses from other nodes in the network that can or will assist the node at which the method 200 is executing in accomplishing a desired data transfer with a second node. In one embodiment, the partner request message includes one or more details about the desired network connection (e.g., "would like to connect remotely to node X").

In step 206, the method 200 receives at least one partner acknowledgement message from at least one other node in the network that can assist in the execution of the desired data transfer.

In step 208, the method 200 selects a partner node from the one or more nodes that responded to the partner request message with a partner acknowledgement message. In one embodiment, the selection of a partner node is based at least in part on how quickly a potential partner node responds (e.g., the first node to respond to the partner request message) and/or on the attributes (e.g., network speed, such as T1, cable, DSL or modem) of the potential partner node, if such attributes are supplied.

Once the partner node has been selected, the method 200 proceeds to step 210 and connects to the partner node (e.g., via a standard push connection if the node at which the method 200 is executing is behind a firewall). If the method 200 is unable to successfully connect to the selected partner node, the method 200 may select another of the nodes that responded with a partner acknowledgement message. In one embodiment, once the connection is established, the method 200 provides details regarding the desired network connection (e.g., "would like to connect remotely to node X") to the partner node.

The method 200 then commences the desired data transfer via the partner node in step 212. Thus, if the method 200 is executing at a requesting node, the method 200 will receive the desired data from the partner node; if the method 200 is executing at a responding node, the method 200 will deliver the desired data to the partner node, which will in turn deliver the desired data to the requesting node.

In step 214, the method 200 determines whether the data transfer is complete. If the method 200 determines in step 214 that the data transfer is not complete, the method 200 returns to step 212 and continues to transfer the desired data.

Alternatively, if the method 200 determines in step 214 that the data transfer is complete, the method 200 proceeds to step 216 and disconnects from the partner node. The method 200 then terminates in step 218.

The method 200 thereby assists in the transfer of data between two nodes that are unable to connect directly by enabling the two nodes to use a partner node as an intermediary. The desired data is transferred to the partner node, which in turn delivers the data to the requesting node. In this manner, the desired data transfer can take place despite the inability of the transferring parties to connect directly. In addition, the use of an intermediary enables a user to monitor or control the data that is transferred to or from a given node. The present invention may therefore be further implemented, for example, to help parents monitor their children's file sharing activities.

Figure 3:
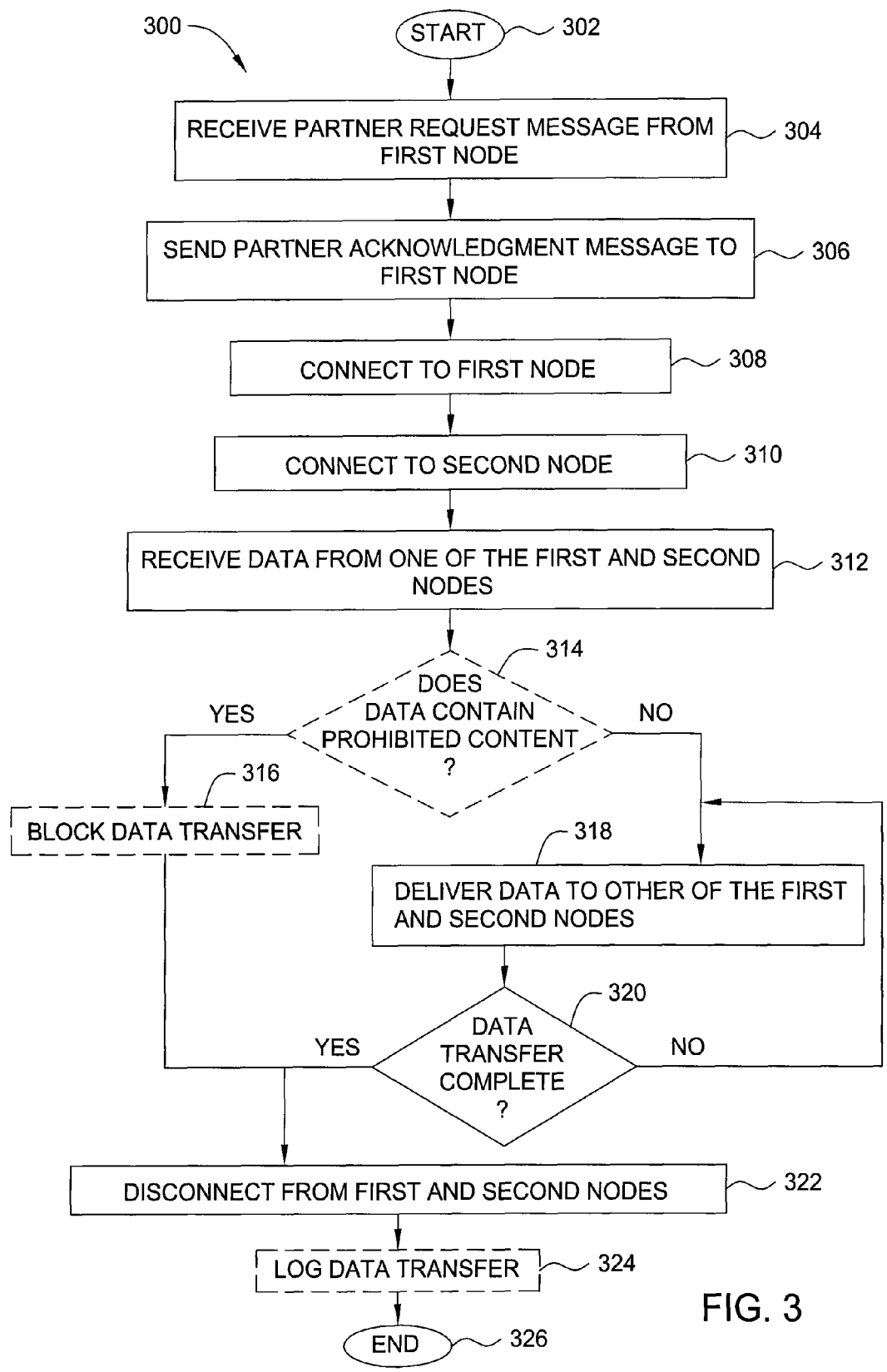
FIG. 3 is a flow diagram illustrating one embodiment of a method for assisting a data transfer between a first and a second network node, according to the present invention.

FIG. 3 is a flow diagram illustrating one embodiment of a method 300 for assisting a data transfer between a first and a second network node, according to the present invention. The method 300 may be implemented, for example, at a node that acts as a partner node in a data transfer between two nodes that are unable to connect directly.

The method 300 is initialized at step 302 and proceeds to step 304, where the method 300 receives a partner request message from the first node. As described above, the partner request message is a message from the first node that solicits the assistance of a partner node in executing a data transfer with another node. In one embodiment, the partner request message includes one or more details about the desired network connection (e.g., "would like to connect remotely to node X").

In step 306, the method 300 sends a partner acknowledgement message to the first node, in response to the partner request message. The partner acknowledgement message indicates that the node at which the method 300 is executing can or will assist with the desired data transfer. In one embodiment, the method 300 chooses to respond to the partner request message with a partner acknowledgement message based on the availability of the node at which the method 300 is executing (e.g., central processing unit time, network bandwidth, etc.) and/or on a time to live (TTL) value specified in the partner request message (e.g., as the TTL value decreases, the probability increases that another node will respond to the partner request message). In another embodiment, the method 300 chooses to respond to the partner request message with a partner acknowledgement message based on a randomly generated number. In such an embodiment, the method 300 essentially "flips a coin" to determine whether to respond to the partner request message, although the distribution of possible responses is not necessarily 50/50 (respond/don't respond). For example, if the TTL value of the partner request message is high, the odds of the method 300 responding may be approximately equal to the odds of the method 300 not responding (e.g., 50/50). However, if the TTL value of the partner request message is low (e.g., one or two), the odds may be greater that the method 300 will respond (e.g., 90/10). In another embodiment (e.g., where the node at which the method 300 is executing has been configured to monitor the file sharing activities of the first node), the method 300 always sends a partner acknowledgement message in response to a partner request message from the first node. In such a situation, the node at which the method 300 is executing may have multiple active network connections on behalf of the first node.

In step 308, the method 300 connects to the first node, e.g., based on the first node making a selection of a partner node. The method 300 then connects to the second network node, e.g., the node that the first node wishes either to send data to or to receive data from. In one embodiment, the method 300 connects to the second node only after the first node has connected and provided details regarding the desired network connection (e.g., "would like to connect remotely to the second node"). In one embodiment, if one or both of the first and second nodes is behind a firewall, the method 300 connects to such nodes using a standard push connection.

In step 312, the method 300 receives data from one of the first node and the second node, whichever is the responding node for the desired data transfer.

Once the data has been received, the method 300 optionally proceeds to step 314 (illustrated in phantom) and determines whether the data includes any prohibited content (e.g., based on a keyword search). As discussed above, this enables the node at which the method 300 is executing to control the data that is delivered to or from the first node and/or the second node. Thus, step 314 may be executed by a parent monitoring the file sharing activities of his or her child, but may be skipped by users that wish to share data in an unsupervised fashion.

If the method 300 determines in optional step 314 that the data does contain prohibited content, the method 300 proceeds to step 316 and blocks the data transfer. That is, the method 300 will not deliver the data to the intended recipient (i.e., the first or the second node). In one embodiment, the threshold for assessing prohibited content is user-dependent (e.g., dependent on how strict the parent wants to make the filter). For example, the occurrence of one keyword may be sufficient grounds to block the data transfer. Alternatively, a threshold number of keywords (e.g., at least n keywords) may be required before the data transfer is blocked.

In one embodiment, data that is blocked in accordance with step 316 is deleted. In another embodiment, data that is blocked in accordance with step 316 is stored (e.g., to be reviewed by a parent).

The method 300 then proceeds to step 322 and disconnects from the first node and the second node. In step 324 (illustrated in phantom), the method 300 then optionally logs the attempted data transfer (e.g. stores a record of the attempted data transfer, for example in a database). In one embodiment, the log of the attempted data transfer includes at least one of: what was searched for (e.g., the text string), what was downloaded (e.g., the file name, file size, etc.), and what was returned (e.g., the search results). In one embodiment, a review of the search results can give an indication of how well the filter blocked prohibited content. Because slang words and variations on spellings evolve constantly, frequent review of the filter's results may be desirable. The method 300 then terminates in step 326.

Alternatively, if the method 300 determines in optional step 314 that the data received in step 312 does not contain prohibited content, the method 300 proceeds to step 318 and delivers the data to the other of the first node and the second node, whichever is the requesting node for the desired data transfer.

In step 320, the method 300 determines whether the data transfer is complete. If the method 300 determines that the data transfer is not complete, the method 300 returns to step 318 and continues the data transfer.

However, if the method 300 determines in step 320 that the data transfer is complete, the method 300 proceeds to step 322 and proceeds as described above to disconnect from the first and second nodes and optionally log the data transfer.

Figure 4:
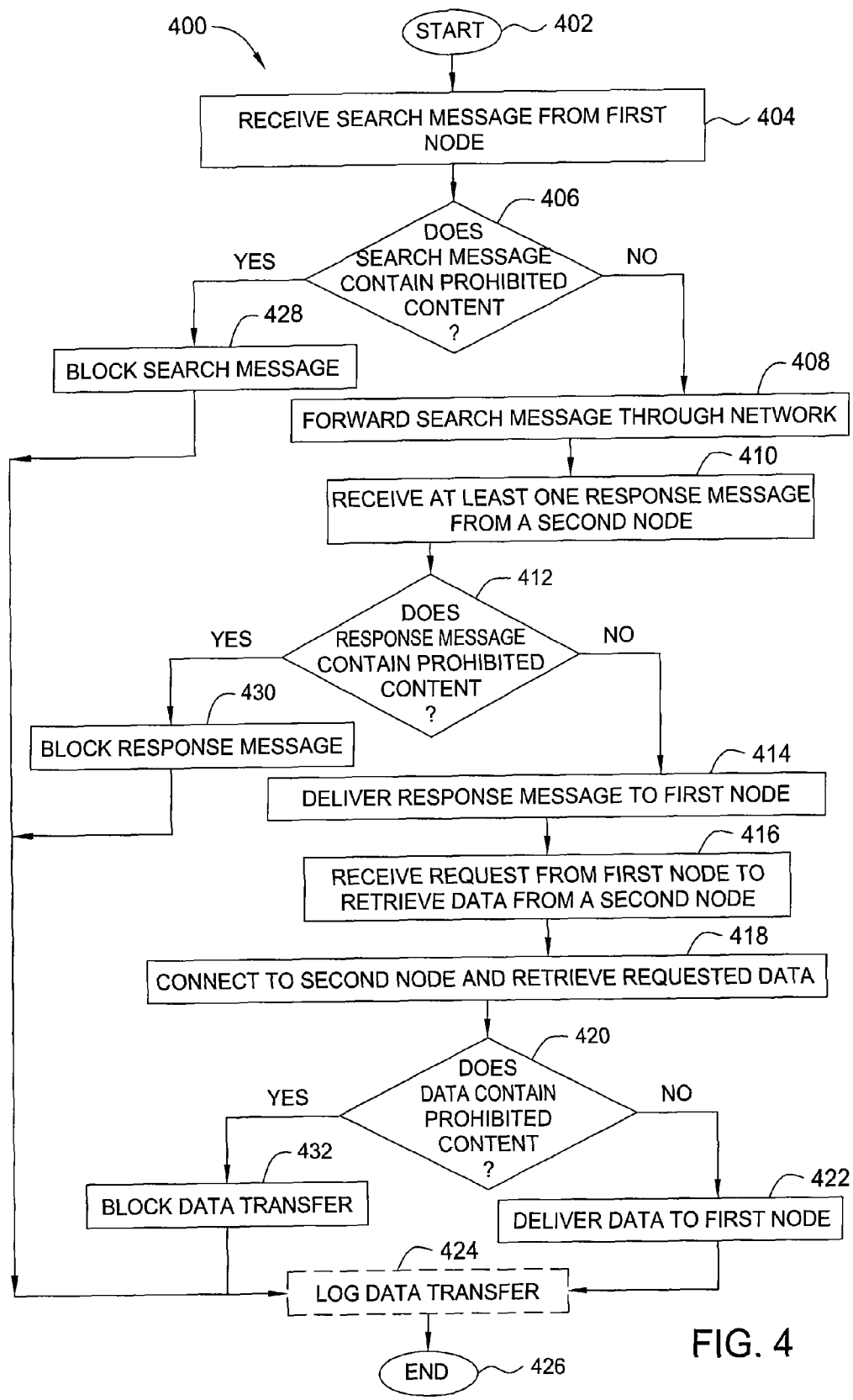
FIG. 4 is a flow diagram illustrating one embodiment of a method for monitoring network traffic and/or data transfers to and from a node, according to one embodiment of the present invention.

FIG. 4 is a flow diagram illustrating one embodiment of a method 400 for monitoring network traffic and/or data transfers to and from a node, according to one embodiment of the present invention. The method 400 may be implemented, for example, at a node controlled by a parent who wishes to monitor the file sharing activities of his or her child. In such an embodiment, the node operated by the child may be forced to connect to other nodes through the node operated by the parent, for example due to a network firewall that prohibits the node operated by the child from directly connecting to the P2P network. As discussed above, a parent-operated or monitoring node may be configured to monitor the transfer of data to and from a child-operated or monitored node. In further embodiments, the monitoring node may be configured to monitor all network traffic to and from the monitored node in addition to transferred data or files. In such a situation, the monitored node may maintain only a single connection to the monitoring node, which maintains multiple connections on behalf of the monitored node. In this manner, all traffic to and from the monitored node must first pass through the monitoring node.

The method 400 is initialized at step 402 and proceeds to step 404, where the method 400 receives a search message from a first (e.g., monitored) node. The first node may be operated, for example, by a child. The search message may contain a text string including keywords related to data that the first node wishes to retrieve from a network.

In step 406, the method 400 determines whether the search message contains prohibited content (e.g., based on the occurrence of one or more keywords in the search message). If the method 400 determines in step 406 that the search message does contain prohibited content, the method 400 proceeds to step 428 and blocks the search message (e.g., does not forward the search message). The method 400 then proceeds to optional step 424 (illustrated in phantom) and logs the attempted data transfer before terminating in step 426. If the attempted data transfer is not logged, the method 400 may simply delete the blocked search message.

Alternatively, if the method 400 determines in step 406 that the search message does not contain prohibited content, the method 400 proceeds to step 408 and forwards the search message through the network.

In step 410, the method 400 receives at least one response message from a second node, e.g., indicating that the second node has the data requested in the search message.

In step 412, the method 400 determines whether the response message contains any prohibited content (e.g., based on the occurrence of one or more keywords in the response message). If the method 400 determines in step 412 that the response message does contain prohibited content, the method 400 proceeds to step 430 and blocks the response message (e.g., does not forward the response message to the first node). The method 400 then proceeds to optional step 424 and logs the attempted data transfer before terminating in step 426.

Alternatively, if the method 400 determines in step 412 that the response message does not contain any prohibited content, the method 400 proceeds to step 414 and delivers the response message to the first node.

In step 416, the method 400 receives a request from the first node to retrieve data from the second node, e.g., in accordance with the response message. The method 400 then connects to the second node and retrieves the requested data in step 418.

In step 420, the method 400 determines whether the retrieved data contains any prohibited content (e.g., based on the occurrence of one or more keywords in the data, or the detection of a virus). In one embodiment, the method 400 determines the content of the retrieved data by first retrieving the entire file and then reviewing the data. In another embodiment, the method 400 reviews individual bytes of data as they are received. In yet another embodiment, the method 400 simply saves the data locally for later review.

If the method 400 determines in step 420 that the retrieved data does contain prohibited content, the method 400 proceeds to step 432 and blocks the data transfer (e.g., does not forward the retrieved data to the first node). The method 400 then proceeds to optional step 424 and logs the attempted data transfer before terminating in step 426.

However, if the method 400 determines in step 420 that the retrieved data does not contain prohibited content, the method 400 proceeds to step 422 and delivers the retrieved data to the first node, before optionally logging the data transfer in step 424 and terminating in step 426. In one embodiment, the method 400 delivers the entirety of the retrieved data (e.g., an entire file) to the first node. In another embodiment, the method 400 delivers individual bytes of the data to the first node as the bytes are retrieved and reviewed.

Figure 5:
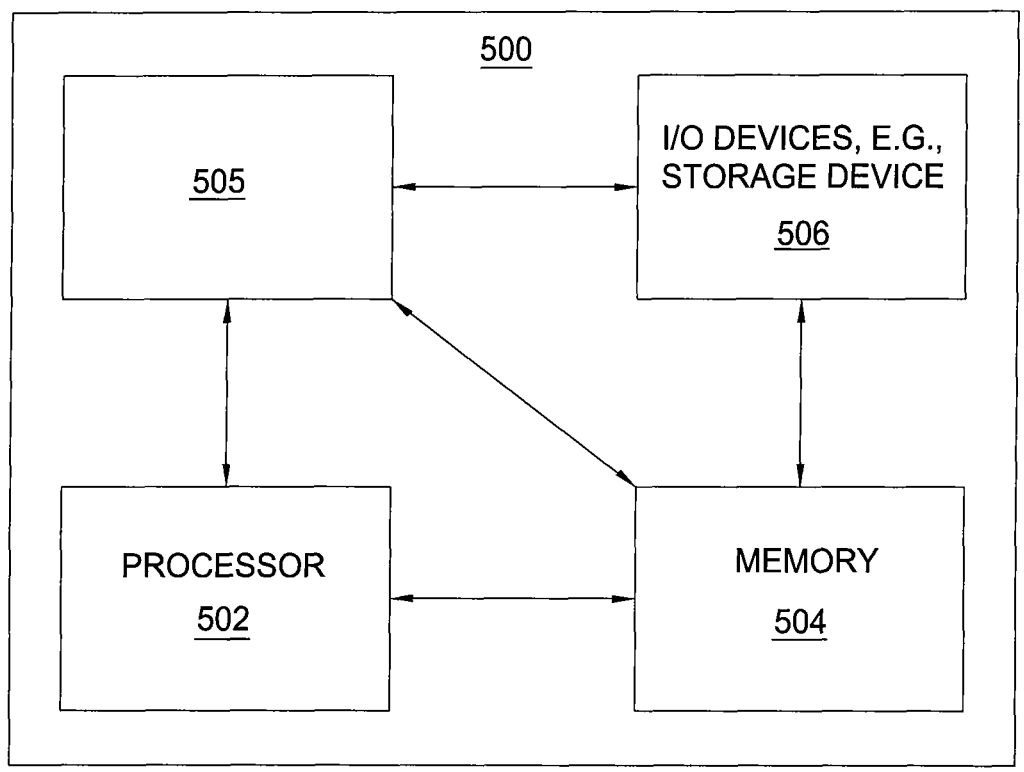
FIG. 5 is a high level block diagram of the connection assistance method that is implemented using a general purpose computing device.

FIG. 5 is a high level block diagram of the connection assistance method that is implemented using a general purpose computing device 500. In one embodiment, a general purpose computing device 500 comprises a processor 502, a memory 504, a connection assistance module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the connection assistance module 505 can be implemented as a physical device or subsystem that is coupled to a processor through a communication channel.

Alternatively, the connection assistance module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the connection assistance module 505 for facilitating communications between two nodes in a peer-to-peer network described herein with reference to the preceding Figures can be stored on a computer readable medium or carrier (e.g., RAM, magnetic or optical drive or diskette, and the like).

Thus, the present invention represents a significant advancement in the field of data transfer networks. A method and apparatus are provided that enable data to be transferred between two nodes that are unable to connect directly by enabling the two nodes to use a partner node as an intermediary. The desired data is transferred to the partner node, which in turn delivers the data to the requesting node. In this manner, the desired data transfer can take place despite the inability of the transferring parties to connect directly. In addition, the use of an intermediary enables a user to monitor or control the data that is transferred to or from a given node. The present invention may therefore be further implemented, for example, to help parents monitor their children's file sharing activities.

While foregoing is directed to the preferred embodiment of the present invention, other and further embodiments of the invention may be devised without departing from the basic scope thereof, and the scope thereof is determined by the claims that follow.

The invention claimed is:

1. A method for transferring data from a first node to a second node in a peer-to-peer network, said method comprising steps of:
   receiving, at a third node in said peer-to-peer network, a request for connection assistance from one of said first node and said second node, where said second node has expressed a desire to obtain said data from said first node, but said first node and said second node are unable to connect to each other directly, and wherein said third node is configured for monitoring data transfers involving at least one of said first node and said second node;
   deciding, by said third node, whether to offer assistance in a transfer of said data, based on a probability proportional to a value in a time to live field of said request for connection assistance;
   if said third node decides to offer the assistance, sending, by said third node, an acknowledgement to said first node or to said second node in response to said request for connection assistance, where said acknowledgement indicates that said third node is able to assist in a transfer of said data;
   connecting, by said third node, directly to said first node;
   connecting, by said third node, directly to said second node;
   receiving, at said third node, said data from said first node; and
   delivering, by said third node, said data to said second node,
   wherein the first node, the second node, and the third node are peers of each other in the peer-to-peer network.

2. The method of claim 1, wherein said third node maintains at least one active network connection on behalf of said at least one of said first node or said second node.

3. The method of claim 1, wherein said request for connection assistance includes one or more details relating to a transfer of said data.

4. The method of claim 1, wherein said one of said first node or said second node provides one or more details relating to a transfer of said data upon connecting to said third node.

5. The method of claim 1, further comprising:
   logging, at said third node, a transfer of said data upon completion of said transfer.

6. The method of claim 1, further comprising:
   examining, by said third node, said data for prohibited content; and
   blocking, by said third node, a transfer of said data to said second node when said data contains prohibited content.

7. The method of claim 6, further comprising:
   deleting said prohibited content.

8. The method of claim 6, further comprising:
   storing said prohibited content at said third node for later review by a user of said third node.

9. The method of claim 1, wherein said first node is behind a first network firewall and said second node is behind a second network firewall.

10. The method of claim 1, wherein a network outage exists on a path between said first node and said second node.

11. The method of claim 1, further comprising, prior to receiving said request for connection assistance:
    receiving, at said third node, a search request message from said second node, said search request message containing a first text string comprising one or more keywords related to said data;
    examining, at said third node, said first text string for a presence of prohibited content;
    forwarding, by said third node, said search request message through said peer-to-peer network when said first text string does not contain prohibited content; and
    blocking, by said third node, said search request message when said first text string contains prohibited content.

12. The method of claim 11, further comprising:
    receiving, at said third node, a response message from said first node, said response message containing a second text string indicating that said first node has said data;
    examining, by said third node, said second text string for a presence of prohibited content;
    forwarding, by said third node, said response message to said second node when said second text string does not contain prohibited content; and
    blocking, by said third node, said response message when said second text string contains prohibited content.

13. The method of claim 1, wherein said first node and said second node are both known to each other.

14. The method of claim 1, wherein said request for connection assistance is sent to a plurality of nodes including said third node.

15. A computer readable storage device containing an executable program for transferring data from a first node to a second node in a peer-to-peer network, where the program comprises steps of:
    receiving, at a third node in said peer-to-peer network, a request for connection assistance from one of said first node and said second node, where said second node has expressed a desire to obtain said data from said first node, but said first node and said second node are unable to connect to each other directly, and wherein said third node is configured for monitoring data transfers involving at least one of said first node and said second node;
    deciding, by said third node, whether to offer assistance in a transfer of said data, based on a probability proportional to a value in a time to live field of said request for connection assistance;
    if said third node decides to offer the assistance, sending, by said third node, an acknowledgement to said first node or to said second node in response to said request for connection assistance, where said acknowledgement indicates that said third node is able to assist in a transfer of said data;
    connecting, by said third node, directly to said first node;
    connecting, by said third node, directly to said second node;
    receiving, at said third node, said data from said first node; and delivering, by said third node, said data to said second node.

16. Apparatus for transferring data from a first node to a second node in a peer-to-peer network, comprising:
   means for receiving, at a third node in said peer-to-peer network, a request for connection assistance from one of said first node and said second node, where said second node has expressed a desire to obtain said data from said first node, but said first node and said second node are unable to connect to each other directly, and wherein said third node is configured for monitoring data transfers involving at least one of said first node and said second node;
   means for deciding, by said third node, whether to offer assistance in a transfer of said data, based on a probability proportional to a value in a time to live field of said request for connection assistance;
   means for sending, by said third node and if said third node decides to offer the assistance, an acknowledgement to said first node or to said second node in response to said request for connection assistance, where said acknowledgement that said third node is able to assist in a transfer of said data;
   means for connecting, by said third node, directly to said first node;
   means for connecting, by said third node, directly to said second node;
   means for receiving, at said third node, said data from said first node; and
   means for delivering, by said third node, said data to said second node,
   wherein the first node, the second node, and the third node are peers of each other in the peer-to-peer network.

* * * * *